June 17, 1947.  J. M. DODWELL  2,422,533
CLUTCH
Filed June 21, 1944  3 Sheets-Sheet 1

INVENTOR
J.M.DODWELL
BY Fetherstonhaugh & Co.
ATTORNEYS

June 17, 1947.   J. M. DODWELL   2,422,533
CLUTCH
Filed June 21, 1944   3 Sheets-Sheet 2
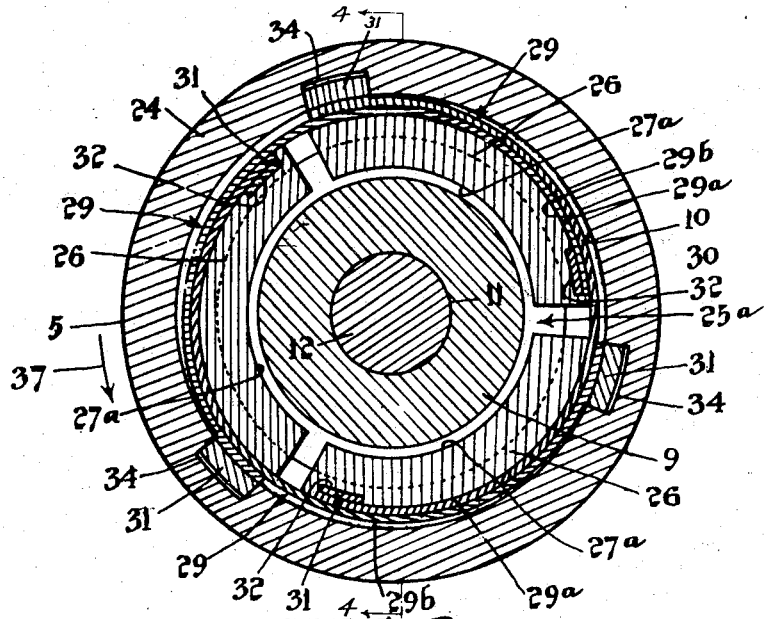
FIG.3
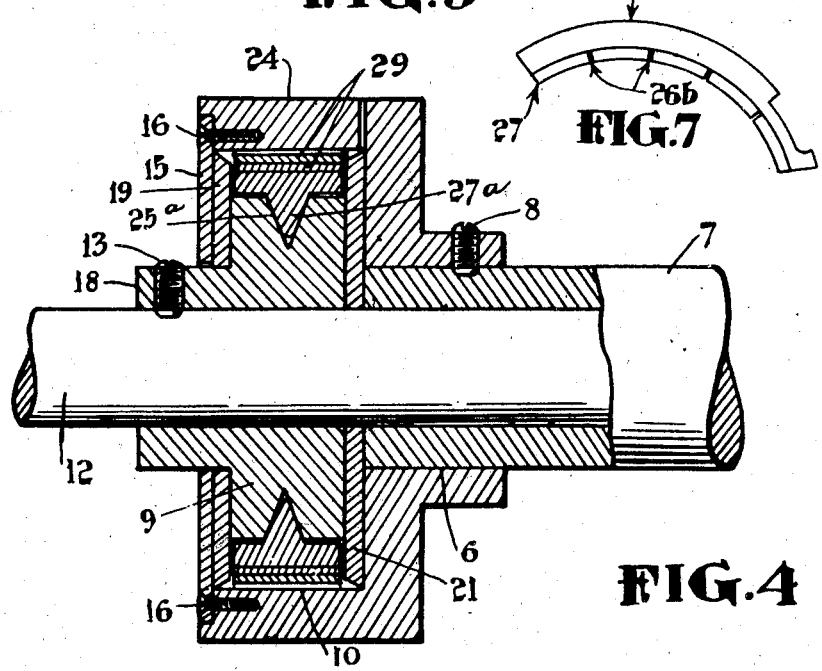
FIG.7
FIG.4
INVENTOR
J. M. DODWELL
Fetherstonhaugh & Co.
ATTORNEYS

INVENTOR
J. M. DODWELL
ATTORNEYS

Patented June 17, 1947

2,422,533

UNITED STATES PATENT OFFICE 2,422,533

CLUTCH

John M. Dodwell, Shawbridge, Quebec, Canada

Application June 21, 1944, Serial No. 541,309
In Canada April 19, 1944

21 Claims. (Cl. 192—41)

This invention relates to improvements in overrunning clutches and consists in certain novel features and combinations of apertures set forth in the following detailed description and illustrated by the accompanying drawings, in which, Figure 1 is a vertical sectional view of my improved clutch.

Figure 3 is a view similar to Figure 1 but showing a slight modification.

Figure 4 is a sectional view taken substantially along the line 4—4 of Figure 3.

Figure 7 is a side view of one of the shoes shown in Figs. 1 and 2.

Figure 1:
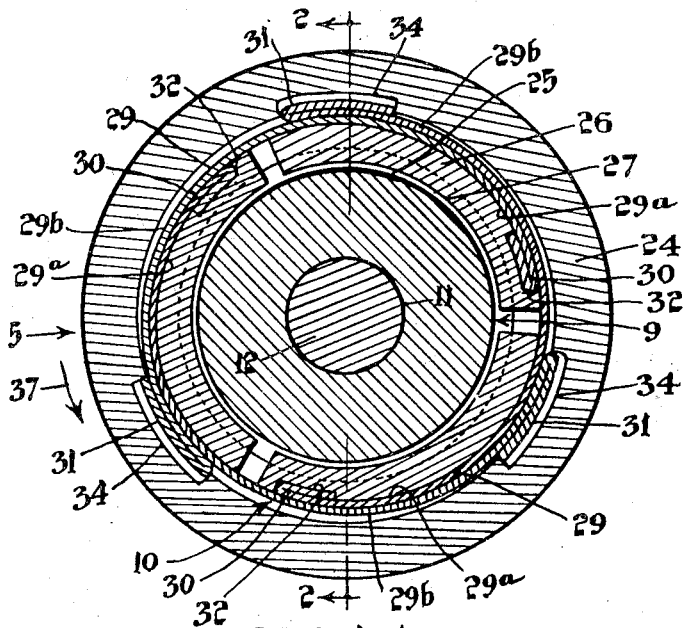
Figure 2:
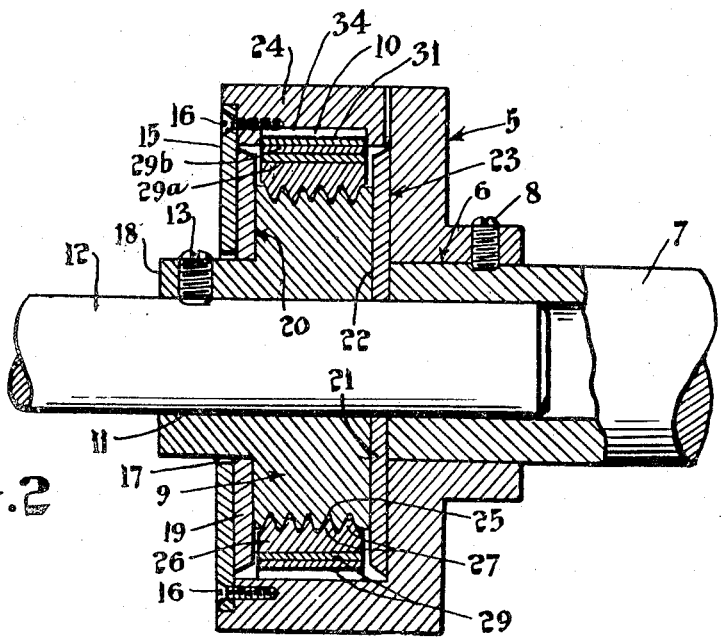
Figure 2 is a sectional view taken substantially along the line 2—2 of Figure 1.

The clutch assembly shown in Figs. 1 and 2 includes a cup-shaped female clutch member 5 provided with a central opening 6 in which a shaft 7 is secured by set-screw 8 or other suitable fastening means. A male clutch member 9 is fitted in the cup-shaped cavity 10 of member 5 and is provided with a central opening 11 in which a shaft 12 is secured by set-screw 13 or other fastening means. One end of shaft 12 projects beyond member 9 and is rotatably fitted in the adjacent hollow end of shaft 7. If desired, a suitable bushing (not shown) may be arranged in the hollow end of shaft 7 to provide a bearing for shaft 12.

A closure plate 15 is secured in place over the open side of cavity 10 by screws 16 or other suitable retaining means. Plate 15 is provided with a central opening 17 for the passage of a hub 18 which projects laterally from member 9 and carries the set screw 13.

A thrust washer 19 encircles hub 18 and is interposed between cover plate 15 and the adjacent radial surface 20 of member 9. A similar thrust washer 21 encircles shaft 12 and is interposed between the radial surface 22 of member 9 and the radial wall 23 of member 5.

Member 9 is formed with an outer, annular, peripheral surface which is radially spaced from the surrounding annular wall 24 of cavity 10 and is provided with a series of laterally spaced annular V-grooves 25. A plurality of segmental shoes 26 are arranged in circular series about the outer peripheral surface of member 10 with the ends of each shoe spaced from the ends of the adjacent shoes. Each shoe 26 is provided with inwardly directed substantially V-shaped rib-like projections 27 which are fitted in the grooves 25 in frictional contact with the side walls of said grooves. The grooves 25 and projections 27 are designed so that a slight clearance is left between the inner peripheral surface of member 5 and the body portions of shoes 26 when the projections are arranged in frictional contact with the side walls of the grooves. The slope angle of the inclined sides of each V-groove and the V-shaped projection fitted therein is such as to give a very efficient application of the V-belt driving principle for the tranmission of torque from one clutch member to the other in the engaged or running condition of the clutch. While the slope angle best suited to this purpose is readily determined in accordance with the principles applied in designing V-belt drives, it is important to note that the selected slope angle should be such that the ribs, while cooperating with the side walls of the grooves to give the maximum traction efficiency when subjected to the clutch engaging pressure of the shoe actuating bands hereinafter referred to, will slip freely in the grooves when relieved of such pressure.

The shoes 26 are spaced radially from the cavity-forming wall 24 but are connected therewith by actuating or pressure applying bands 29 which preferably comprise pre-curved strips of spring metal. The bands 29 are considerably longer than the shoes 26 and are arranged in overlapping relation with each other. A portion 29a of each band covers substantially the entire outer circumferential surface of one shoe while another portion 29b of said band projects beyond said shoe and overlaps the shoe covering portion 29a of the next band as clearly shown in Figure 1. Each band 29 is provided with terminal keys 30 and 31, the key 30 being fitted in a recess 32 provided in the shoe covered by said band and the key 31 being fitted in a recess 34 provided in the cavity-forming wall 24. In the present instance the ends of each band are shown reversely bent upon the body of the band and brazed in place to provide the keys 30 and 31 but it will be understood that these keys may be formed separately and welded or otherwise secured to the body of the band.

When the clutch is at rest the bands 29 exert sufficient inward radial pressure on shoes 26 to maintain the shoe projections 27 in frictional contact with the side walls of grooves 25.

In describing the operation of the clutch assembly it will be assumed that member 5 and shaft 7 constitute the driving parts; that member 9 and shaft 12 constitute the driven parts;

and that arrows 37 (Fig. 1) indicate the direction in which the driving parts are rotated at a speed greater than that of the driven parts in the engaged or running condition of the clutch. When member 5 rotates relative to member 9 in the direction indicated by arrows 37 it tends to carry with it the shoe actuating bands 29. This pull on the bands 29 is opposed by the frictional engagement resisting circumferential movement of the shoes 26 about the member 9. This results in tensioning of the bands 29 about the member 9 and increases the pressure between the inclined sides of the projections 27 and the engaging inclined sides of the grooves 25. Member 9 is thus caused to rotate with member 5 by the torque transmitted to member 9 through the agency of bands 29 and shoes 26.

When member 9 over-runs or tends to over-run member 5 in the direction indicated by arrows 37 the tension in the bands 29 and the contact pressure between the shoes 26 and the member 9 are reduced sufficiently to permit free wheeling of member 9 with reference to member 5. Any sticking of the shoes 26 which tends to resist free-wheeling of member 9 causes the bands 29 to be subjected to longitudinal compression between the shoes and the wall 24 of member 5 with the result that the contact pressure between the shoes and member 9 is reduced by the positive outward pressure which the bands exert on the shoes due to the compressive stressign of the bands.

With reference to the foregoing description of the tensioning and compression of bands 29 between member 5 and shoes 26 it will be noted that the portions of the bands which are connected to member 5 are tangential to the outer circular periphery of member 9. It is also pointed out that the overlapping portions of the bands 29 which overlie the outer circumferentially extending surface of each shoe 26 ensures that the inward radial pressure imposed on each shoe by said overlapping band portions is substantially uniform from end to end of the shoe. This is important since it improves the torque-transmitting traction of the shoes and prevents localized wearing of the engaging traction surfaces of the shoes and member 9 due to uneven distribution of the pressure applied to said shoes. The overlapping arrangement of the bands 29 also has a vibration-dampening effect which prevents vibration of the bands from producing a chattering effect at certain critical operating speeds.

The shoes 26 are preferably made of metal but may be composed of any other suitable material. These shoes, especially when made of metal, are preferably provided with slots or saw cuts 26b (Fig. 7) to interrupt the continuity of the projections 27 and increase the flexibility of the shoes so that they may be curved, either initially or under the applied pressure of the bands 29, to conform more truly to the circular outer periphery of member 9.

I have also found that the provision of the slots or saw cuts 26b reduces slippage of the shoes in the running condition of the clutch. It is, of course, desirable to lubricate the contacting surfaces of the shoe projections 27 and the walls of the grooves 25 so that the projections will slip freely in the grooves in the over-running or free-wheeling condition of the clutch. However, such lubrication sometimes results in undesirable slippage of the shoes in the running condition of the clutch owing, apparently, to the formation of oil films which, in the absence of the slots or saw cuts 26b, prevent the applied pressure of the shoe-actuating bands developing the desired friction between the projections 27 and the side walls of the grooves 25. I am not presently prepared to fully explain how the provision of the slots or saw cuts 26b results in the breaking down of these oil films in the running condition of the clutch. It appears, however, that these slots or saw cuts increase the flexibility of the shoe so that the applied pressure of the shoe-actuating bands is rendered more effective to force the shoes inwardly with sufficient pressure to disrupt or displace the film-forming oil lying between the sides of the projections 27 and the opposing side walls of the grooves 25. It also appears probable that, in the running condition of the clutch, the breaking down of the oil films in question is due, at least in part, to the oil-film shearing action of the end edges of the sections into which the projections 27 are divided by the slots or saw cuts 26b.

The modified clutch assembly shown in Figs. 3 and 4 is the same as that previously described except that, in the modified assembly, each shoe 26 is provided with only a single large V-shaped projection 27a which is fitted in a single large annular V-groove 25a provided in member 9. This modified assembly is perfectly feasible but the arrangement shown in Figures 1 and 2 is preferred since the thinner and more flexible shoes conform better to the circular periphery of member 9 and provide a greater area of frictional contact with said member. It may also be pointed out that the small multiple grooves shown in Figs. 1 and 2 do not weaken member 9 to the same extent as the large groove shown in Figures 3 and 4.

It will be understood that the number of shoes and associated overlapping bands employed in the clutches described herein is not a critical factor. Good results have been obtained in the operation of a clutch having only two shoes and two associated overlapping shoe-actuating bands. Clutches in which the number of shoes and bands exceeds that shown in Figures 1 to 4 inclusive also exhibit satisfactory operating characteristics. As a matter of fact many of the important advantages of my invention are realized in a clutch assembly in which a single shoe is covered by several turns of a single actuating band having one end keyed to the shoe and the other end keyed to the member 5.

Figure 5:
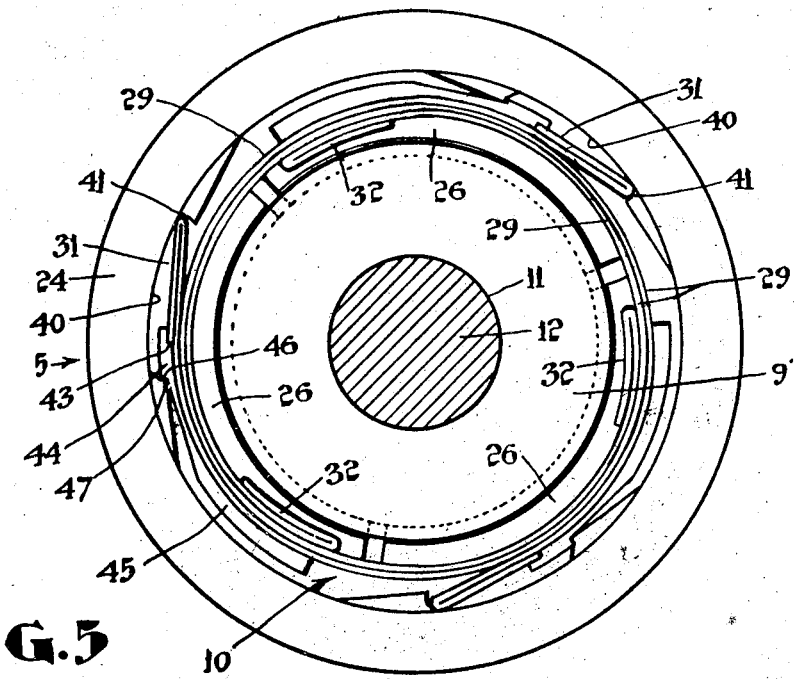
Figure 5 is a sectional view, similar to Fig. 1, showing a further modification.
Figure 6:
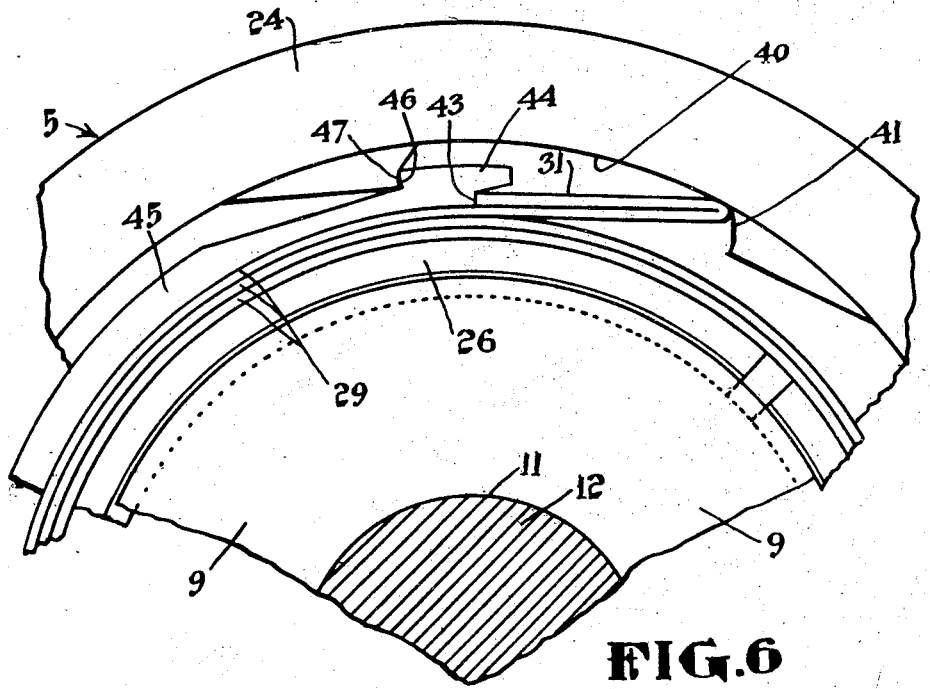
Figure 6 is an enlarged detail view of a portion of the assembly shown in Figure 5.

In Figures 5 and 6 I have shown a further modified clutch assembly in which centrifugal weights are utilized to counterbalance centrifugal forces tending to move or hold the shoes 26 out of effective frictional engagement with member 9. There are times, during the free wheeling conditions of the clutch, when it is desirable to re-engage the clutch while the shoes 26 and bands 29 are rotating at a relatively high rate of speed and are subjected to centrifugal forces which in the absence of some opposing counterbalancing or neutralizing force, would be effective to hold the shoes 26 out of effective contact with member 9.

The bands 29 shown in Figs. 5 and 6 are made long enough so that each band, in addition to covering the outer surface of the shoe to which it is attached, also overlaps the shoe covering portions of both of the remaining bands. The key 31 of each band is fitted in a recess 40 so that one end of the key is opposed to the inclined outer portion 41 of the end wall 42 of said recess. The other end of the key is fitted in a recess 43 provided at the inner corner portion of the adjacent end portion 44 of a circumferentially extending centrifugal weight 45 which is here shown as comprising a curved segment of suitable mass lying between the cavity wall 24 and the bands 29. The end portion 44 of the weight extends into recess 40 and is provided with a shoulder 46 which bears against the remaining end wall 47 of the recess to provide a fulcrum mounting for the weight. It is important to note that the contacting portions of the key 31 and weight 45 are radially offset in an inward direction with reference to the contacting portions of the weight 45 and the recess wall 47.

During rotation of the clutch member 5 the centrifugal force acting on the weights 45 causes them to fulcrum on the shoulders 46 so that the free ends of the weights move outwardly toward the cavity wall 24 while the end portions 44 move inwardly and exert inward radial pressure on the engaging keys 31 and bands 29. This inward pressure of the weights on the bands 29 is preferably predetermined so that it just counterbalances and neutralizes the centrifugal force tending to move the bands 29 and the shoes 26 away from the clutch member 9. It will also be noted that the end walls 41 of the recesses which are engaged by the adjacent ends of the keys 31 are shaped to provide sufficient clearance to permit the keys to move inwardly under the necessary pressure applied by the weights 45.

One function of the weights 45 will be understood from the following description in which it is assumed that the clutch is being used as a starter clutch for starting up an automobile or other internal combustion engine. It frequently happens that the engine, after being started up, in cold weather, especially, is incorrectly choked and will lose speed until it comes to a stop unless the operator is able, in the meantime, to reengage the starter clutch to again bring the starter motor into action. Suppose now that either of the clutches shown in Figures 1 and 3 has been operated to start up the engine and that the operator is keeping his foot on the starter pedal even though the engine has started and is causing the driven member of the clutch to overrun the driving member. Under these conditions the shoes 26 and bands 29 will be rotating at such a high rate of speed that the centrifugal force acting thereon will be effective to move and hold the shoes away from the member 9 so that the clutch will not be effectively reengaged even when the engine underchokes and slows down to the point where the speed of the rotation of the driven member drops below that of the driving member. It will therefore be seen that the clutches shown in Figs. 1 and 3 cannot be effectively reengaged except when the engine is at a standstill or when the speed of rotation of the driving clutch member is below the critical speed range at which the centrifugal force acting on the bands 29 and shoes 26 in the free-wheeling condition of the clutch tend to hold or move the shoes 26 away from effective clutch engaging contact with the member 9. In the clutch shown in Figs. 5 and 6 this difficulty is overcome since the centrifugal forces acting to move the weights 45 outwardly are utilized to exert sufficient inward pressure on the bands 29 and shoes 26 to counterbalance and neutralize the centrifugal forces tending to move or hold said bands or shoes away from driving engagement with the member 9. It will thus be seen that the effective frictional engagement provided between the shoes 26 and the member 9 when the clutch is at rest is maintained substantially constant when the clutch is operating at high-free wheeling speeds so that the clutch will automatically reengage whenever the speed of the driven member falls below that of the driving member.

Another important function of the weights 45 is to minimize breakage of the bands by eliminating sharp bending stresses to which portions of the bands in the vicinity of the keys 31 would otherwise be subjected when the bands are tensioned between member 5 and shoes 26. This is best explained by reference to Figs. 1 and 3 in which one end of each key 31 is in direct torque-receiving engagement with the trailing end wall of recess 34 when member 5 is rotating in the direction indicated by arrows 37. In practice it is impossible to form and install the shoe-actuating bands so that their overlapping portions will be in actual contact with each other at all points. The unavoidable clearance between the bands is very slight but, when the bands are tensioned around the shoes, the overlapping portions of the bands tend to move radially inwardly to close up the intervening clearance spaces. This "closing-up" or inward radial movement of the bands is resisted by the contact pressure between each key 31 and the engaging end wall of the key-receiving recess 34 with the result that the portion of each band located immediately adjacent the torque-receiving end of key 31 is subjected to severe bending stresses and is apt to break at this point, especially when the bands are subjected to sudden heavy back-fire tension stresses.

In the case of the construction shown in Figs. 5 and 6 the inward movement of the end portions 44 of the weight 45, whether due to centrifugal forces or to tensioning of the bands, causes that portion of each band which is located under and immediately in advance of the torque-receiving end of its key 31, to be moved inwardly and pressed inwardly against the underlying bands, thereby facilitating the inward radial or "closing-up" movement of the bands and eliminating the sharp bending stresses previously referred to.

Having thus described the principles of my invention and several preferred embodiments thereof, it will be understood that various modifications may be resorted to within the scope and spirit of the invention as defined by the appended claims. For example, the shoes described herein may be made of any suitable metallic or non-metallic material. Good results have been obtained with shoes made of cast iron and also with shoes made of self-lubricating metal such, for example, as oil impregnated sintered bronze.

I claim:

1. An over-running clutch comprising a rotatably mounted clutch member, shoe means arranged around said clutch member in frictional contact therewith, a second rotatably mounted clutch member, and torque transmitting band means overlying said shoe means and connected to the second clutch member, the arrangement being such that the band means is tensioned around the underlying shoe means by predetermined relative rotation of said clutch members and is thereby caused to exert radial pressure on the shoe means to increase the contact pressure between the shoe means and the first mentioned clutch member sufficiently to cause the two clutch members to be rotated as a unit by the torque transmitted from the driving clutch member to the driven clutch member through the agency of said shoe and band means.

2. An over-running clutch comprising a rotatably mounted clutch member, shoe means arranged around said member in frictional contact therewith, a second clutch member rotatable relatively to the first mentioned clutch member, band means overlying said shoe means and having one end connected to said shoe means and the other end connected to the second clutch member, the arrangement being such that the band means is tensioned around the underlying shoe means by predetermined relative rotation of said clutch members and is thereby caused to exert inward radial pressure on the shoe means to increase the contact pressure between the shoe means and the first mentioned clutch member sufficiently to cause the two clutch members to be rotated as a unit by the torque transmitted from the driving clutch member to the driven clutch member through the agency of said shoe and band means, said clutch being further characterized in that the contact pressure between the shoe means and the first mentioned clutch member is reduced as the result of compression stresses to which the band means is subjected between the shoe means and the first mentioned clutch member when the driven clutch member tends to over-run the driving clutch member, the said reduction of contact pressure being sufficient to permit free-wheeling of the driven clutch member.

3. An over-running clutch comprising a rotatably mounted clutch member provided with an outer annular surface, a plurality of shoes arranged around said member and presenting curved inner surfaces disposed in frictional contact with said annular surface, a second clutch member rotatable relatively to the first mentioned clutch member, and a plurality of curved metal bands connected between the shoes and the second clutch member, each band including a portion covering the outer surface of the shoe to which it is attached and another portion overlapping the shoe covering portion of one or more of the companion bands.

4. An over-running clutch comprising a rotatably mounted clutch member, shoe means arranged around said member, a second clutch member rotatable relatively to the first mentioned clutch member, actuating means for said shoe means overlying said shoe means and connected between said shoe means and the second clutch member, said actuating means functioning automatically, in response to predetermined relative rotation of said clutch members, to effect sufficient contact pressure between the shoe means and the first mentioned clutch member to cause the two clutch members to rotate as a unit, said actuating means permitting the contact pressure between the shoe means and the first mentioned clutch member to be decreased to permit free-wheeling of the driven clutch member when the latter tends to over-run the driving clutch member, and means for opposing and counterbalancing the centrifugal forces which tend to move or hold the shoe means and the actuating means away from the first mentioned clutch member during rotation of said shoe means and said actuating means.

5. An over-running clutch comprising a rotatably mounted clutch member, shoe means arranged around said member, a second clutch member rotatable relatively to the first mentioned clutch member, actuating means for said shoe means overlying said shoe means and connected between said shoe means and the second clutch member, said actuating means functioning automatically, in response to predetermined relative rotation of said clutch members, to effect sufficient contact pressure between the shoe means and the first mentioned clutch member to cause the two clutch members to rotate as a unit, said actuating means permitting the contact pressure between the shoe means and the first mentioned clutch member to be decreased to permit free-wheeling of the driven clutch member when the latter tends to over-run the driving clutch member, and centrifugal weights acting against said actuating means to oppose and counterbalance the centrifugal forces which tend to move or hold the shoe means and the actuating means away from the first mentioned clutch member during rotation of said shoe means and said actuating means.

6. An over-running clutch as set forth in claim 3 including means functioning automatically in response to rotation of said shoes and bands to exert inward pressure on said bands in opposition to the centrifugal forces tending to move or hold the shoes or bands away from the first mentioned clutch member.

7. An over-running clutch as set forth in claim 3 including means functioning automatically in response to rotation of said shoes and bands to exert inward pressure on said bands in opposition to the centrifugal forces tending to move or hold the shoes or bands away from the first mentioned clutch member, said last mentioned means being arranged to act against that end of each band which is connected to the second clutch member.

8. An over-running clutch comprising a rotatably mounted clutch member presenting an annular peripheral surface, a curved shoe arranged in frictional contact with said surface, a second clutch member rotatable relatively to the first mentioned clutch member and a torque transmitting metal shoe-actuating band overlying said shoe and constituting the sole torque transmitting connection between said shoe and the second clutch member, said band having one end anchored to the shoe and the other end anchored to the second clutch member.

9. An over-running clutch comprising a rotatably mounted clutch member presenting an annular peripheral surface, a plurality of curved shoes spaced around said annular surface in frictional contact therewith, a second clutch member rotatable relatively to the first mentioned clutch and about the same axis and a separate metal band connected between each shoe and a portion of the second clutch member which overlies but is spaced from said shoes, each of said bands including a shoe-covering portion covering the outer peripheral surface of the shoe to which it is attached and another portion which projects beyond one end of the attached shoe and overlaps the shoe-covering portion of one or more of the companion bands.

10. An over-running clutch comprising a rotatably mounted clutch member, presenting an annular peripheral surface, a plurality of curved shoes spaced around said annular surface in frictional contact therewith, a second clutch member rotatable relatively to the first mentioned clutch member and about the same axis, a plurality of overlapping curved metal bands covering the outer circumferentially extending surfaces of all of said shoes, one end of each band being provided with an anchoring key fitted in a key-receiving recess provided in one of said shoes and the other end of each band being provided with an anchoring key fitted in a key-receiving recess provided in a portion of the second mentioned clutch member which overlies but is spaced from the outer circumferential surfaces of said shoes.

11. An over-running clutch as set forth in claim 10, in which the ends of the bands which are keyed to the second clutch member are free to move inwardly a limited distance relatively to said clutch member and in which centrifugal pressure-applying elements are arranged to exert inward pressure on said last mentioned ends of the bands in opposition to centrifugal forces acting to move or hold the shoes and bands away from the first mentioned clutch member during rotation of said shoes and bands about said axis.

12. An over-running clutch comprising a rotatably mounted clutch member, a plurality of shoes spaced around said member in frictional contact therewith, a second clutch member rotatable relatively to the first clutch member and having the same axis of rotation, a plurality of overlapping curved metal shoe-actuating bands overlying said shoes, each band having one end anchored to one of said shoes and the other end anchored to a part of the second clutch member which overlies but is spaced from said shoes, and a plurality of centrifugal weights, each arranged to exert inward pressure on one of said bands in opposition to centrifugal forces tending to move or hold the shoes and bands away from the first mentioned clutch member when the shoes and bands are rotating about said axis.

13. An over-running clutch as set forth in claim 3, in which said annular surface is provided with an annular V-groove extending therearound and in which each of said shoes is provided with a substantially V-shaped portion which is fitted in said groove in frictional contact with the side walls of the groove.

14. An over-running clutch as set forth in claim 3, in which said annular surface is provided with a plurality of laterally spaced parallel V-grooves extending therearound and in which each of said shoes is provided with a plurality of inwardly directed substantially V-shaped projections, each of which is fitted in one of said grooves in frictional contact with the side walls of the groove.

15. An over-running clutch comprising a rotatably mounted clutch member presenting an annular surface, a plurality of shoes arranged around said surface in frictional contact therewith, a second clutch member rotatable relatively to the first mentioned clutch member and about the same axis of rotation, and a plurality of flexible, torque-transmitting metal bands, each having one end anchored to one of said shoes and the other end anchored to a portion of the second clutch member which overlies but is spaced from said shoes.

16. An over-running clutch as set forth in claim 15 in which said annular surface and said shoes are provided with interfitting frictionally engaged complementary portions substantially V-shaped in cross section.

17. An over-running clutch comprising a rotatably mounted clutch member presenting an annular peripheral surface provided with a V-groove extending therearound, a curved shoe provided with a substantially V-shaped projection fitted in said groove for frictional contact with the side walls of said groove, the continuity of said projection being interrupted by one or more cross slots, a second clutch member rotatable relatively to the first clutch member and a shoe-actuating band overlying said shoe, one end of said band being anchored to the shoe adjacent one end of the shoe and the other end of the band being projected beyond the opposite end of the shoe and anchored to the second clutch member.

18. An over-running clutch comprising a rotatably mounted clutch member provided with an annular peripheral V-groove, shoe means arranged around said clutch member and provided with sloping sides disposed in frictional contact with the side walls of said V-groove, a second clutch member rotatable relatively to the first mentioned clutch member, flexible band-type actuating means for said shoe means overlying and completely covering said shoe means and connected between said shoe means and the second clutch member, said actuating means functioning automatically, in response to predetermined relative rotation of said clutch members, to exert radial pressure on said shoe means and thereby effect sufficient contact pressure between the shoe means and the first mentioned clutch member to cause the two clutch members to rotate as a unit, said actuating means permitting the contact pressure between the shoe means and the first mentioned clutch member to be decreased to permit free-wheeling of the driven clutch member when the latter tends to over-run the driving clutch member.

19. An over-running clutch comprising a rotatably mounted clutch member provided with an annular peripheral surface grooved to provide a plurality of laterally spaced annular V-grooves, shoe means arranged around the annular peripheral surface of said clutch member and provided with a plurality of laterally spaced, substantially V-shaped, inwardly directed projections each of which is fitted in one of said grooves in frictional contact with the side walls of the groove, a second clutch member rotatable relatively to the first mentioned clutch member, flexible band-type actuating means for said shoe means overlying and completely covering said shoe means and connected between said shoe means and the second clutch member, said actuating means functioning automatically, in response to predetermined relative rotation of said clutch members to exert inward radial pressure on said shoe means to thereby effect sufficient contact pressure between the shoe means and the first mentioned clutch member to cause the two clutch members to rotate as a unit, said actuating means permitting the contact pressure between the shoe means and the first mentioned clutch member to be decreased to permit free-wheeling of the driven clutch member when the latter tends to over-run the driving clutch member.

20. An over-running clutch comprising a rotatably mounted clutch member provided with an annular peripheral V-groove, a second clutch member rotatable relatively to the first mentioned clutch member and having the same axis of rotation and a plurality of overlapping torque transmitting bands extending around the first clutch member free of attachment thereto, each band being anchored to the second clutch member and being provided with friction surfaces disposed in frictional contact with the sloping side walls of said V-groove.

21. An over-running clutch comprising a rotatably mounted clutch member provided with an annular peripheral V-groove, a second clutch member rotatable relatively to the first mentioned clutch member and a plurality of overlapping torque transmitting bands extending around the first clutch member free of attachment thereto, each band having one end anchored to the second clutch member and being provided with friction surfaces disposed in frictional contact with the side walls of said V-groove.

JOHN M. DODWELL.

REFERENCES CITED

The following references are of record in the file of this patent:

UNITED STATES PATENTS

| Number | Name | Date |
|---|---|---|
| 1,159,601 | Plamondon | Nov. 9, 1915 |
| 1,534,476 | Wirrer | Apr. 21, 1925 |
| 1,912,407 | Sahli | June 6, 1935 |
| 981,389 | Dearborn | Jan. 10, 1911 |
| 1,436,830 | Sumner | Nov. 28, 1922 |